United States Patent
Tyagi et al.

(10) Patent No.: US 10,157,610 B2
(45) Date of Patent: Dec. 18, 2018

(54) METHOD AND SYSTEM FOR ACOUSTIC DATA SELECTION FOR TRAINING THE PARAMETERS OF AN ACOUSTIC MODEL

(71) Applicant: INTERACTIVE INTELLIGENCE GROUP, INC., Indianapolis, IN (US)

(72) Inventors: Vivek Tyagi, New Delhi (IN); Aravind Ganapathiraju, Hyderabad (IN); Felix Immanuel Wyss, Zionsville, IN (US)

( * ) Notice: Subject to any disclaimer, the term of this patent is extended or adjusted under 35 U.S.C. 154(b) by 0 days.

(21) Appl. No.: 15/850,106

(22) Filed: Dec. 21, 2017

(65) Prior Publication Data

US 2018/0114525 A1  Apr. 26, 2018

Related U.S. Application Data

(63) Continuation of application No. 13/959,171, filed on Aug. 5, 2013.

(60) Provisional application No. 61/680,365, filed on Aug. 7, 2012.

(51) Int. Cl.
*G10L 15/04* (2013.01)
*G10L 15/06* (2013.01)
*G10L 15/14* (2006.01)
*G10L 15/02* (2006.01)

(52) U.S. Cl.
CPC .......... *G10L 15/063* (2013.01); *G10L 15/144* (2013.01); *G10L 2015/025* (2013.01)

(58) Field of Classification Search
CPC .................................. G10L 15/06; G10L 5/04
See application file for complete search history.

(56) References Cited

U.S. PATENT DOCUMENTS

| | | | | |
|---|---|---|---|---|
| 5,963,903 | A * | 10/1999 | Hon et al. | 704/254 |
| 7,457,745 | B2 * | 11/2008 | Kadambe et al. | 704/216 |
| 7,983,915 | B2 * | 7/2011 | Knight et al. | 704/254 |
| 8,015,008 | B2 | 9/2011 | Kim et al. | |
| 8,180,640 | B2 | 5/2012 | Li et al. | |
| 8,195,449 | B2 * | 6/2012 | Bruhn et al. | 704/200.1 |
| 2010/0217589 | A1 | 8/2010 | Gruhn et al. | |
| 2010/0318355 | A1 | 12/2010 | Li et al. | |

OTHER PUBLICATIONS

A Maximum Likelihood Approach to Continuous Speech Recognition, Lalit R. Bahl et al.; 1983; IEEE; p. 179190.

(Continued)

*Primary Examiner* — Shreyans A Patel

(57) ABSTRACT

A system and method are presented for acoustic data selection of a particular quality for training the parameters of an acoustic model, such as a Hidden Markov Model and Gaussian Mixture Model, for example, in automatic speech recognition systems in the speech analytics field. A raw acoustic model may be trained using a given speech corpus and maximum likelihood criteria. A series of operations are performed, such as a forced Viterbi-alignment, calculations of likelihood scores, and phoneme recognition, for example, to form a subset corpus of training data. During the process, audio files of a quality that does not meet a criterion, such as poor quality audio files, may be automatically rejected from the corpus. The subset may then be used to train a new acoustic model.

26 Claims, 2 Drawing Sheets

(56) References Cited

OTHER PUBLICATIONS

International Preliminary Report on Patentability dated Jul. 30, 2014 in related foreign application PCT/US13/53605 (filing date Aug. 5, 2013).
International Search Report dated Feb. 18, 2014 in related international application PCT/US13/53605 (filing date Aug. 5, 2013).
L. R. Bahl, F. Jelinek, and R. L. Mercer, "A maximum likelihood approach to continuous speech recognition", IEEE Trans. on Pattern Analysis and Machine Intelligence, vol. PAMI-5, pp. 179-190, 1983.
L. R. Rabiner, "A tutorial on Hidden Markov Models and Selected Applications in Speech Recognition," In Proceedings of IEEE, vol. 77, No. 2, Feb. 1989.

\* cited by examiner ary of U.S. application Ser.
METHOD AND SYSTEM FOR ACOUSTIC DATA SELECTION FOR TRAINING THE PARAMETERS OF AN ACOUSTIC MODEL

CROSS-REFERENCE TO RELATED APPLICATIONS

This application is a continuation of U.S. application Ser. No. 13/959,171, filed on Aug. 5, 2013, which claims priority and benefit of U.S. Provisional Application No. 61/680,365, filed on Aug. 7, 2012, the contents of both of which are incorporated herein by reference.

BACKGROUND

The present invention generally relates to telecommunication systems and methods, as well as automatic speech recognition systems. More particularly, the present invention relates to selecting acoustic data of a particular quality for training the parameters of an acoustic model, such as a Hidden Markov Model and Gaussian Mixture Model (HMM-GMM), for example, within automatic speech recognition systems.

SUMMARY

A system and method are presented for acoustic data selection of a particular quality for training the parameters of an acoustic model, such as a Hidden Markov Model and Gaussian Mixture Model, for example, in automatic speech recognition systems in the speech analytics field. A raw acoustic model may be trained using a given speech corpus and maximum likelihood criteria. A series of operations are performed, such as a forced Viterbi-alignment, calculations of likelihood scores, and phoneme recognition, for example, to form a subset corpus of training data. During the process, audio files of a quality that does not meet a criterion, such as poor quality audio files, may be automatically rejected from the corpus. The subset may then be used to train a new acoustic model.

In one embodiment, a method is presented for training models in speech recognition systems through the selection of acoustic data comprising the steps of: training an acoustic model; performing a forced Viterbi alignment; calculating a total likelihood score; performing a phoneme recognition; retaining selected audio files; and training a new acoustic model.

In one embodiment, a system for training models in speech recognition systems through the selection of acoustic data comprising: means for training an acoustic model; means for performing a forced Viterbi alignment; means for calculating a total likelihood score; means for performing a phoneme recognition; means for retaining selected audio files; and means for training a new acoustic model.

In one embodiment, a method is provided for training an acoustic model in an automatic speech recognition system comprising the steps of: training a set of raw data using a given speech corpus and the maximum likelihood criteria; performing a forced Viterbi-alignment; calculating a total likelihood score; performing phoneme recognition on audio files in said corpus; retaining selected audio files; forming a subset corpus of training data; and training a new acoustic model with said subset.

DETAILED DESCRIPTION

Figure 1:
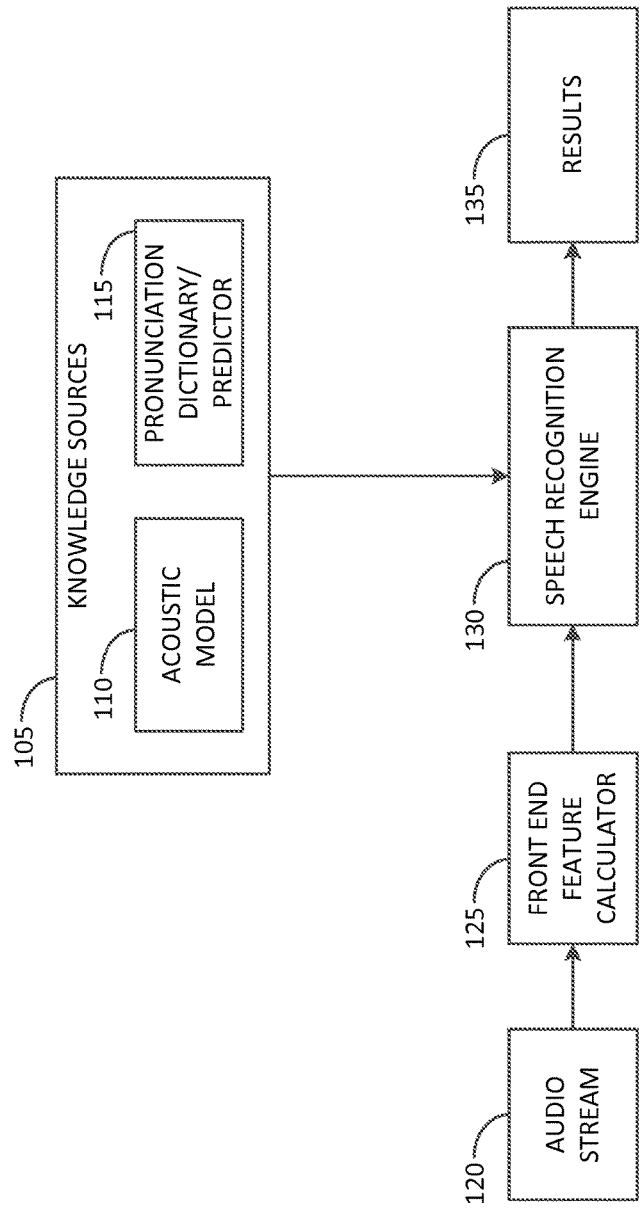
FIG. 1 is a diagram illustrating the basic components of an embodiment of the system.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Automatic speech recognition (ASR) systems analyze human speech and translate it into text or words. There are many considerations regarding how well an ASR system may perform. Performance of these systems is commonly evaluated based on factors such as accuracy, reliability, language support, and the speed with which speech can be recognized. In general, it is expected that the performance of the system be very high. Additional factors such as accent, articulation, speech rate, pronunciation, background noise, etc., may have a negative effect on the accuracy of the system. In situations involving a large corpus of conversations, processing speed is necessary to analyze large numbers of telephone conversations at once and in real-time. The system is expected to perform consistently and reliably irrespective of channel conditions and various artifacts introduced by modern telephony channels, especially voice over IP.

To train a HMM-GMM, the process may begin, in one embodiment, with a human-transcribed speech training-data corpus. This corpus may consist of several speech audio files along with the transcription of the sentence(s) spoken in a particular audio file. The HMM-GMM training algorithm may convert the sentence to a sequence of phonemes that corresponds to the words in the sentence using a pronunciation dictionary. Concurrently, a sequence of feature vectors may be extracted from a signal of some length from the corresponding audio files. The windowing operation is advanced by some time interval to obtain the next feature vector until the end of the audio file is reached. A sequence of phonemes and a sequence of feature vectors are obtained for each audio file, which are in turn used to train the HMM-GMM.

Those skilled in the art will recognize from the present disclosure that the various methodologies disclosed herein may be computer implemented using many different forms of data processing equipment, for example, digital microprocessors and associated memory executing appropriate software program(s).

FIG. 1 is a diagram illustrating an embodiment of the basic components of a system, 100. The basic components of a system 100 may include: Knowledge Sources 105, which may include an Acoustic Model 110 and a Pronunciation Dictionary/Predictor 115; an Audio Stream 120; a Front End Feature Calculator 125; a Speech Recognition Engine 130; and Results 135.

A phoneme is assumed to be the basic unit of sound. A predefined set of such phonemes is assumed to completely describe all sounds of a particular language. The Knowledge Sources 105 may store probabilistic models, for example, HMM-GMM, of relations between pronunciations (phonemes) and acoustic events, such as a sequence of feature vectors extracted from the speech signal. An HMM encodes the relationship of the observed audio signal and the unobserved phonemes. A training process may then study the statistical properties of the feature vectors emitted by a Hidden Markov Model (HMM) state corresponding to a given phoneme over a large collection of transcribed training-data. An emission probability density for the feature vector in a given HMM state of a phoneme is learned (also called acoustic model training) through the training process. More specifically, training is performed for a triphone. An example of a triphone may be a tuple of three phonemes in the phonetic transcription sequence corresponding to a center phone. Several HMM states of triphones are tied together to share a common emission probability density function. Typically, the emission probability density function is modeled using a Gaussian mixture model (GMM). A set of these GMMs and HMMs is termed as an acoustic model.

The Knowledge Sources 105 may be developed by analyzing large quantities of audio data. The acoustic model and the pronunciation dictionary/predictor are made, for example, by looking at a word like "hello" and examining the phonemes that comprise the word. Each word in the speech recognition system is represented by a statistical model of its constituent sub-word units called the phonemes. The phonemes for "hello", as defined in a standard phoneme dictionary, are: "hh", "eh", "l", and "ow". These are then converted to a sequence of triphones, for example, "sil-hh+eh", "hh-eh+l", "eh-l+ow", and "l-ow+sil", where "sil" is the silence phone. Finally, as previously described, the HMM states of all possible triphones are mapped to the tied-states. Tied-states are the unique states for which acoustic model training is performed. These models are language dependent. In order to also provide multi-lingual support, multiple knowledge sources may be provided.

The acoustic model 110 may be formed by statistically modeling the various sounds that occur in a particular language.

The pronunciation dictionary, 115, may be responsible for decomposing a word into a sequence of phonemes. Words presented from the user may be in human readable form, such as grapheme/alphabets of a particular language. However, the pattern matching algorithm may rely on a sequence of phonemes which represent the pronunciation of the keyword. Once the sequence of phonemes is obtained, the corresponding statistical model for each of the phonemes (or the corresponding triphones) in the acoustic model may be examined. A concatenation of these statistical models may be used to perform speech recognition. For words that are not present in the dictionary, a predictor, which is based on linguistic rules, may be used to resolve the pronunciations.

The audio stream (i.e., what is spoken into the system by the user), 120, may be fed into the front end feature calculator, 125, which may convert the audio stream into a representation of the audio stream, or a sequence of spectral features. Audio analysis may be performed by computation of spectral features, for example, Mel Frequency Cepstral Coefficients (MFCC) and/or its transforms.

The signal from the front end feature calculator, 125, may then be fed into a speech recognition engine, 130. The task of the recognition engine may be to take a set of words (called lexicon) and search through presented audio stream, using the probabilities from the acoustic model, to determine the most likely sentence spoken in that audio signal. One example of a speech recognition engine may include but not be limited to a Keyword Spotting System. For example, in the multi-dimensional space constructed by the feature calculator, a spoken word may become a sequence of MFCC vectors forming a trajectory in the acoustic space. Keyword spotting may now simply become a problem of computing probability of generating the trajectory given the keyword model. This operation may be achieved by using the well-known principle of dynamic programming, specifically the Viterbi algorithm, which aligns the keyword model to the best segment of the audio signal, and results in a match score. If the match score is significant, the keyword spotting algorithm infers that the keyword was spoken and reports a keyword spotted event.

The resulting sequence of words 135 may then be reported in real-time. The report may be presented as a start and end time of the keyword in the audio stream with a confidence value that the keyword was found. The primary confidence value may be a function of how the keyword is spoken. For example, in the case of multiple pronunciations of a single word, the keyword "tomato" may be spoken as "te-mah-toh" and "te-may-toh". The primary confidence value may be lower when the word is spoken in a less common pronunciation or when the word is not well enunciated. The specific variant of the pronunciation that is part of a particular recognition is also displayed in the report.

Figure 2:
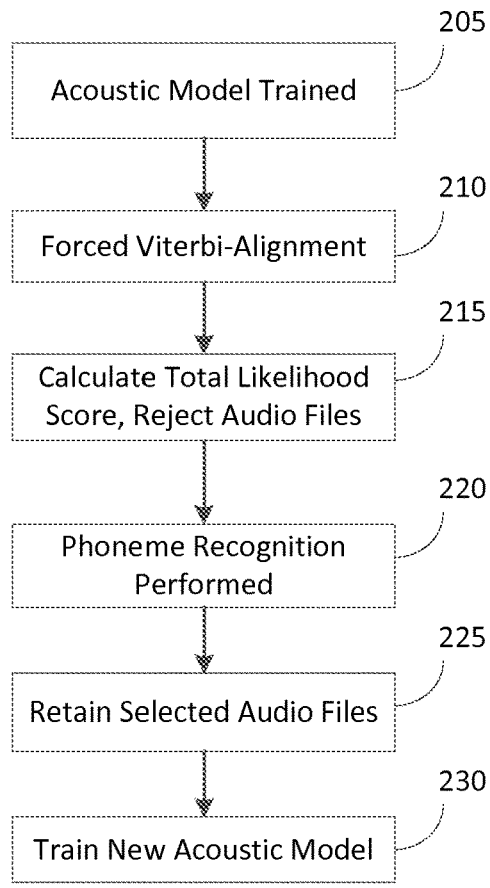
FIG. 2 is a flowchart illustrating an embodiment of the selection process.

As illustrated in FIG. 2, a process 200 for illustrating an embodiment of a selection process is provided. The process 200 may be operative in the Acoustic Model 110 of the Knowledge Sources 105 component of the system 100 (FIG. 1). An acoustic model may be trained on a train-data-set of the language using the well-known maximum likelihood criterion in the following process.

In step 205, the acoustic model is trained. For example, an HMM-GMM acoustic model, which may be represented as $\mathcal{M}_{raw}$, may be trained using the given speech corpus $\mathcal{C}_{raw}$ and the maximum likelihood criterion. A sequence of feature vectors $X=\{x_1, x_2, \ldots, x_N\}$ and the corresponding sequence of HMM states $Q=\{q_1, q_2, \ldots, q_N\}$ may be obtained by the available phonetic transcription of the sentence in the audio signal. The maximum likelihood acoustic model training may comprise estimating the $\mathcal{M}_{raw}$ parameters of the probability distribution that maximizes the likelihood of the training data given the phonetic transcription. Control is passed to operation 210 and the process 200 continues.

In operation 210, a forced Viterbi-alignment is performed and the average frame likelihood score calculated. For example, the forced Viterbi-alignment of the corpus $\mathcal{C}_{raw}$ may be performed using the acoustic model $\mathcal{M}_{raw}$. As a by-product of the forced alignment, the total likelihood score $\alpha_r$ for each audio file $\alpha_r$ is obtained, where $r \in 1, 2, \ldots, R$. Assuming that the audio file $\alpha_r$ consist of $f_r = N$ feature frames, i.e., $X=\{x_1, x_2, \ldots, x_N\}$, with the underlying forced aligned HMM states being $Q=\{q_1, q_2, \ldots, q_N\}$, the total likelihood of the audio file $\alpha_r$ is given as:

$$\alpha_r = p(x_1|q_1)\Pi_{i=2}^{N} P(q_i|q_{i-1})p(x_i|q_i)$$

where $P(q_i|q_{i-1})$ represents the HMM state transition probability between states 'i−1' and 'i' and $p(x_i|q_i)$ represents the state emission likelihood of the feature vector $x_i$ being present in the state $q_i$. All of the audio files $a_r$ together form the corpus $\mathcal{C}_{raw}$. Assuming 'f'$_r$ frames in the audio file $a_r$, an average frame likelihood score may be obtained using the equation:

$$\beta_r = \frac{\alpha_r}{f_r}$$

where $\beta_r$ represents the average frame likelihood score. Control is passed to operation 215 and the process 200 continues.

In operation 215, the total likelihood of the score is calculated and audio files are rejected. For example, $\beta_r$ may be averaged where $r \in 1, 2, \ldots, R$ to obtain an average frame likelihood score $\delta$ over the entire corpus $\mathcal{C}_{raw}$. The value of $\delta$ may be indicative of the average frame likelihoods over the entire corpus, which may consist of varying quality of audio files. This quality may range from very bad, to mediocre, to very good. The poor quality audio file may either have poor audio condition, and/or poor articulation by the speaker, and/or poor sentence transcription by the human transcriber. In one embodiment, the goal is to automatically reject such audio files and their transcription from the training-data corpus. This is illustrated in the following equation:

$$\delta = \sum_{r=1}^{R} \frac{\beta_r}{R}$$

Control is passed to step 220 and process 200 continues.

In operation 220, phoneme recognition is performed and the average phoneme recognition accuracy is obtained. In the following example, a phoneme recognition of the audio file $\alpha_r$ using the Viterbi search and the acoustic model $\mathcal{M}_{raw}$. The correct phoneme recognition accuracy of each audio file may also be estimated with the available manual transcription (ground-truth) of each of the files. The following equation is used to obtain the average phoneme recognition accuracy, denoted by $\nu$ over the corpus $\mathcal{C}_{raw}$:

$$\nu = \sum_{r=1}^{R} \frac{\gamma_r}{R}$$

where $\gamma_r$ represents the accuracy of $\alpha_r$.

Control is passed operation 225 and the process 200 continues.

In operation 225, the selected audio files are retained. For example, using the global frame likelihood score $\delta$ and the global phoneme recognition accuracy $\nu$ as reference values, only the audio files $a_g$ are retained such that the average frame likelihood $\beta_g$ is above a certain threshold value $\Delta$ of the global average $\delta$ or its phoneme recognition accuracy $\gamma_g$ is above a certain threshold $\mu$ of the global phoneme recognition accuracy $\nu$. Thus, $a_g$ is retained if, $$\beta_g \geq \delta + \Delta$$

or, $$\gamma_g \geq \nu + \mu$$

where $\Delta$ and $\mu$ are user specified thresholds. A user may typically specify that $\Delta = -0.1 \times \delta$ and $\mu = -0.2 \times \nu$.

A subset of training-data corpus is formed, $\mathcal{C}_{good}$, which contains data of the desired quality.

Control is passed to step 230 and process 200 continues.

In operation 230, a new HMM-GMM acoustic model $\mathcal{M}_{good}$ is trained using only the data in the corpus $\mathcal{C}_{good}$ and the process ends. The new acoustic-model $\mathcal{M}_{good}$ may be used in subsequent speech recognition systems.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the inventions as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

Although a very narrow claim is presented herein, it should be recognized the scope of this invention is much broader than presented by the claim. It is intended that broader claims will be submitted in an application that claims the benefit of priority from this application.

The invention claimed is:

1. A computer-implemented method for training acoustic models in an automatic speech recognition system through a selection of acoustic data comprising:
   training a first acoustic model in the automatic speech recognition system using a training-data corpus comprising a plurality of speech audio files and a respective plurality of transcriptions for the plurality of speech audio files;
   performing a forced Viterbi alignment of the plurality of speech audio files using the trained first acoustic model in the automatic speech recognition system;
   calculating a global frame likelihood score $\delta$ for the plurality of speech audio files, wherein the global frame likelihood score $\delta$ comprises an average of frame likelihoods over the training-data corpus;
   creating a first subset of the training-data corpus comprising one or more audio files by selecting the one or more audio files from the plurality of speech audio files based on the global frame likelihood score $\delta$;
   performing a phoneme recognition of the plurality of speech audio files using the trained first acoustic model and the respective plurality of transcriptions in the automatic speech recognition system;
   calculating a global phoneme recognition accuracy $\nu$ for the plurality of speech audio files;
   creating a second subset of the training-data corpus comprising audio files retained from the one or more audio files of the first subset of the training-data corpus which meet at least one predetermined criterion indicating that an audio file has good audio quality; and
   training a second acoustic model in the automatic speech recognition system using the second subset of the training-data corpus.

2. The method of claim 1, wherein the training the first acoustic model further comprises:
   calculating a maximum likelihood criterion of the training-data corpus; and
   estimating parameters of a probability distribution of the first acoustic model that maximize the maximum likelihood criterion.

3. The method of claim 1, wherein the first acoustic model comprises a Hidden Markov Model and a Gaussian Mixture Model.

4. The method of claim 1, wherein the performing the forced Viterbi alignment further comprises:
   obtaining a total likelihood score $\alpha_r$ for each of the plurality of speech audio files.

5. The method of claim 4, wherein $\alpha_r = p(x_1|q_1)\Pi_{i=2}^{N} P(q_i|q_{i-1})p(x_i|q_i)$, where $P(q_i|q_{i-1})$ represents a Hidden Markov Model state transition probability between states 'i−1' and 'i' and $p(x_i|q_i)$ represents a state emission likelihood of a feature vector $x_i$ being present in a state $q_i$.

6. The method of claim 4, further comprising using a mathematical equation $$\beta_r = \frac{\alpha_r}{f_r}$$

to determine an average frame likelihood score of a speech audio file, wherein $\beta_r$ is the average frame likelihood score, $\alpha_r$ is the total likelihood score of the speech audio file, and $f_r$ is a number of feature frames of the speech audio file.

7. The method of claim 1, wherein performing the forced Viterbi alignment further comprises:
determining an average frame likelihood score $\beta_r$ for each of the plurality of speech audio files.

8. The method of claim 1, further comprises:
calculating a phoneme recognition accuracy $\gamma$ for each of the plurality of speech audio files.

9. The method of claim 1, wherein the at least one predetermined criterion comprising at least one criterion selected from a group comprising:
a first criterion based on an average frame likelihood score $\beta$ of the retained speech audio files and the global frame likelihood score $\delta$; and
a second criterion based on a phoneme recognition accuracy $\gamma$ of the retained speech audio files and the global phoneme recognition accuracy $v$.

10. The method of claim 9, wherein the first criterion comprises determining whether the average frame likelihood score of the retained speech audio files satisfies a criterion $\beta_r \geq \delta + \Delta$, where $\Delta$ is a first predetermined threshold, and wherein the second criterion comprises determining whether the phoneme recognition accuracy $\gamma_g$ of the retained speech audio files satisfies a criterion $\gamma_g \geq v + \mu$, where $\mu$ is a second predetermined threshold.

11. The method of claim 10, wherein $\Delta = -0.18$.

12. The method of claim 10, wherein $\mu = -0.2v$.

13. The method of claim 1, further comprising using a mathematical equation $$\delta = \sum_{r=1}^{R} \frac{\beta_r}{R}$$

to obtain the global frame likelihood score $\delta$, wherein $\beta_r$ is an average frame likelihood score and R is the total number of the plurality of speech audio files.

14. The method of claim 1, further comprising using a mathematical equation $$v = \sum_{r=1}^{R} \frac{\gamma_r}{R}$$

to obtain the global phoneme recognition accuracy, wherein $\gamma_r$ represents a phoneme recognition accuracy of a total likelihood score $\alpha_r$ of an audio file $\alpha_r$ of the plurality of speech audio files.

15. A computer-implemented method for training acoustic models in an automatic speech recognition system comprising:
training a first acoustic model in the automatic speech recognition system using a speech corpus comprising a plurality of speech audio files and a respective plurality of transcriptions for the plurality of speech audio files by calculating a maximum likelihood criterion of the speech corpus and estimating parameters of a probability distribution of the first acoustic model that maximize the maximum likelihood criterion;
performing a forced Viterbi alignment of the plurality of speech audio files using the trained first acoustic model in the automatic speech recognition system;
calculating a global frame likelihood score $\delta$ for the plurality of speech audio files, wherein the global frame likelihood score $\delta$ comprises an average of frame likelihoods over the speech corpus;
creating a first subset of the speech corpus comprising one or more audio files by selecting the one or more audio files from the plurality of speech audio files based on the global frame likelihood score $\delta$;
performing a phoneme recognition of the plurality of speech audio files using the trained first acoustic model and the respective plurality of transcriptions in the automatic speech recognition system;
calculating a global phoneme recognition accuracy $v$ for the plurality of speech audio files;
creating a second subset of the speech corpus comprising audio files retained from the one or more audio files of the first subset of the speech corpus which meet at least one predetermined criterion indicating that an audio file has good audio quality; and
training a second acoustic model in the automatic speech recognition system with said second subset of the speech corpus.

16. The method of claim 15, wherein the at least one predetermined criterion comprises at least one criterion selected from a group comprising:
a first criterion based on an average frame likelihood score $\beta$ of the retained speech audio files and the global frame likelihood score $\delta$; and
a second criterion based on a phoneme recognition accuracy $\gamma$ of the retained speech audio files and the global phoneme recognition accuracy $v$.

17. The method of claim 16, wherein the first criterion comprises determining whether an average frame likelihood score $\beta_r$ of the retained speech audio files satisfies a criterion $\beta_r \geq \delta + \Delta$, where $\Delta$ is a first predetermined threshold, and wherein the second criterion comprises determining whether a phoneme recognition accuracy $\gamma_g$ of the retained speech audio files satisfies a criterion $\gamma_g \geq v + \mu$, where $\mu$ is a second predetermined threshold.

18. The method of claim 17, further comprising using a mathematical equation:

$$\delta = \sum_{r=1}^{R} \frac{\beta_r}{R}$$

to obtain the global frame likelihood score $\delta$, wherein $\beta_r$ is the average frame likelihood score and R is the total number of the plurality of speech audio files.

19. The method of claim 15, wherein performing the forced Viterbi alignment further comprises:
obtaining a total likelihood score $\alpha_r$ for each audio file of the plurality of speech audio files.

20. The method of claim 19, wherein the total likelihood score $\alpha_r$ is obtained using a mathematical equation: $\alpha_r = p(x_i|q_i)\Pi_{i=2}^{N}P(q_i|q_{i-1})p(x_i|q_i)$, where $P(q_i|q_{i-1})$ represents a Hidden Markov Model state transition probability between states 'i−1' and 'i' and $p(x_i|q_i)$ represents a state emission likelihood of a feature vector $x_t$ being present in a state $q_i$.

21. The method of claim 19, wherein an average frame likelihood score of an audio file is obtained using a mathematical equation:

$$\beta_r = \frac{\alpha_r}{f_r}$$

wherein $\beta_r$ is the average frame likelihood score, $\alpha_r$ is the total likelihood score of the audio file, and $f_r$ is a number of feature frames of the audio file.

22. The method of claim 19, wherein the speech corpus contains varying quality audio files.

23. The method of claim 15, wherein performing the forced Viterbi alignment further comprises:
 determining an average frame likelihood score for each of the plurality of speech audio files.

24. The method of claim 15, further comprises:
 a phoneme recognition accuracy γ for each of the plurality of speech audio files.

25. The method of claim 15, wherein creating the subset speech corpus comprises automatically rejecting bad quality files and transcriptions from the speech corpus.

26. The method of claim 15, further comprising using a mathematical equation:

$$v = \sum_{r=1}^{R} \frac{\gamma_r}{R}$$

to obtain the global phoneme recognition accuracy, wherein $\gamma_r$ represents a phoneme recognition accuracy of a total likelihood score $\alpha_r$ of an audio file $\alpha_r$ of the plurality of speech audio files.

* * * * *

UNITED STATES PATENT AND TRADEMARK OFFICE
CERTIFICATE OF CORRECTION

PATENT NO. : 10,157,610 B2  
APPLICATION NO. : 15/850106  
DATED : December 18, 2018  
INVENTOR(S) : Vivek Tyagi et al.

It is certified that error appears in the above-identified patent and that said Letters Patent is hereby corrected as shown below:

In the Claims

Column 7, Line 37, Claim 11, delete "0.18." and insert -- 0.1$\delta$. --

Signed and Sealed this  
Twenty-eighth Day of January, 2020

Andrei Iancu  
*Director of the United States Patent and Trademark Office*